(12) United States Patent
Tajima et al.

(10) Patent No.: US 11,029,850 B2
(45) Date of Patent: Jun. 8, 2021

(54) SYSTEM OF CONTROLLING DATA REBALANCE AND ITS METHOD

(71) Applicant: Hitachi, Ltd., Tokyo (JP)

(72) Inventors: Sachie Tajima, Tokyo (JP); Hiroaki Akutsu, Tokyo (JP); Takahiro Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 170 days.

(21) Appl. No.: 16/328,407

(22) PCT Filed: Dec. 13, 2016

(86) PCT No.: PCT/JP2016/086964
§ 371 (c)(1),
(2) Date: Feb. 26, 2019

(87) PCT Pub. No.: WO2018/109816
PCT Pub. Date: Jun. 21, 2018

(65) Prior Publication Data
US 2019/0369877 A1 Dec. 5, 2019

(51) Int. Cl.
*G06F 12/00* (2006.01)
*G06F 3/06* (2006.01)

(52) U.S. Cl.
CPC .......... *G06F 3/0608* (2013.01); *G06F 3/0659* (2013.01); *G06F 3/0673* (2013.01)

(58) Field of Classification Search
CPC .... G06F 3/0608; G06F 3/0659; G06F 3/0673; G06F 3/0644; G06F 3/067; G06F 12/00; G06F 13/10

(Continued)

(56) References Cited

U.S. PATENT DOCUMENTS

| 2010/0115216 A1* | 5/2010 | Jia | G06F 3/0605 711/162 |
| 2011/0060885 A1 | 3/2011 | Satoyama et al. | |

(Continued)

FOREIGN PATENT DOCUMENTS

| WO | 2010/122674 A1 | 10/2010 |
| WO | 2014/184941 A1 | 11/2014 |
| WO | 2015/008375 A1 | 1/2015 |

OTHER PUBLICATIONS

International Search Report of PCT/JP2016/086964 dated Mar. 21, 2019.

*Primary Examiner* — Mardochee Chery
(74) *Attorney, Agent, or Firm* — Mattingly & Malur, PC

(57) ABSTRACT

A data rebalance control system determines instruction contents for an entity having a rebalance function, based on the capacity information including information indicating a plurality of physical capacities corresponding to a plurality of storing devices which include at least one storing device having a compression function, coupled to one and more computers included in a computer system. The rebalance function of the entity is a function of rebalancing data so that the distribution of the plural logical capacities recognized by the entity, corresponding to the plural storing devices, may be a predetermined distribution. The determined instruction contents include a definition about the logical capacity distribution. The data rebalance control system transmits, to the entity, a rebalance instruction as an instruction to rebalance the data according to the above instruction contents.

13 Claims, 14 Drawing Sheets

(58) Field of Classification Search
USPC .......................................................... 711/154
See application file for complete search history.

(56) References Cited

U.S. PATENT DOCUMENTS

| | | | |
|---|---|---|---|
| 2013/0166502 A1* | 6/2013 | Walkauskas | G06F 16/285 |
| | | | 707/610 |
| 2015/0378613 A1 | 12/2015 | Koseki | |
| 2016/0026405 A1* | 1/2016 | Dhuse | H04L 67/1097 |
| | | | 711/114 |
| 2016/0196075 A1 | 7/2016 | Matsushita | |

* cited by examiner

FIG. 4A

REBALANCE PRIORITY TABLE 306

| REBALANCE ID (421) | APP ID (422) | PRIORITY (423) |
|---|---|---|
| r1 | a2,a3 | 2 |
| r2 | a1 | 1 |
| r3 | a3 | 3 |

FIG. 4B

EXHAUSTION CONDITION TABLE 307

| NODE ID (431) | APP OPERATION (432) | EXHAUSTION CONDITION (433) |
|---|---|---|
| n1 | {a1,[n1,n2,n3]},<br>{a3,[n1,n2,n3]} | PHYSICAL RESIDUAL CAPACITY < 10 GB AND<br>LOGICAL RESIDUAL CAPACITY > PHYSICAL RESIDUAL CAPACITY |
| n2 | {a1,[n1,n2,n3]},<br>{a3,[n1,n2,n3]} | PHYSICAL RESIDUAL CAPACITY < 10 GB AND<br>LOGICAL RESIDUAL CAPACITY > PHYSICAL RESIDUAL CAPACITY |
| n3 | {a1,[n1,n2,n3]},<br>{a3,[n1,n2,n3]} | PHYSICAL RESIDUAL CAPACITY < 10 GB AND<br>LOGICAL RESIDUAL CAPACITY > PHYSICAL RESIDUAL CAPACITY |

FIG. 4C

NODE CAPACITY TABLE 308

| NODE ID (441) | LOGICALLY USED CAPACITY (442) | LOGICAL RESIDUAL CAPACITY (443) | PHYSICALLY USED CAPACITY (444) | PHYSICAL RESIDUAL CAPACITY (445) |
|---|---|---|---|---|
| n1 | 400GB | 200GB | 60GB | 140GB |
| n2 | 400GB | 200GB | 192GB | 8GB |
| n3 | 400GB | 200GB | 120GB | 80GB |

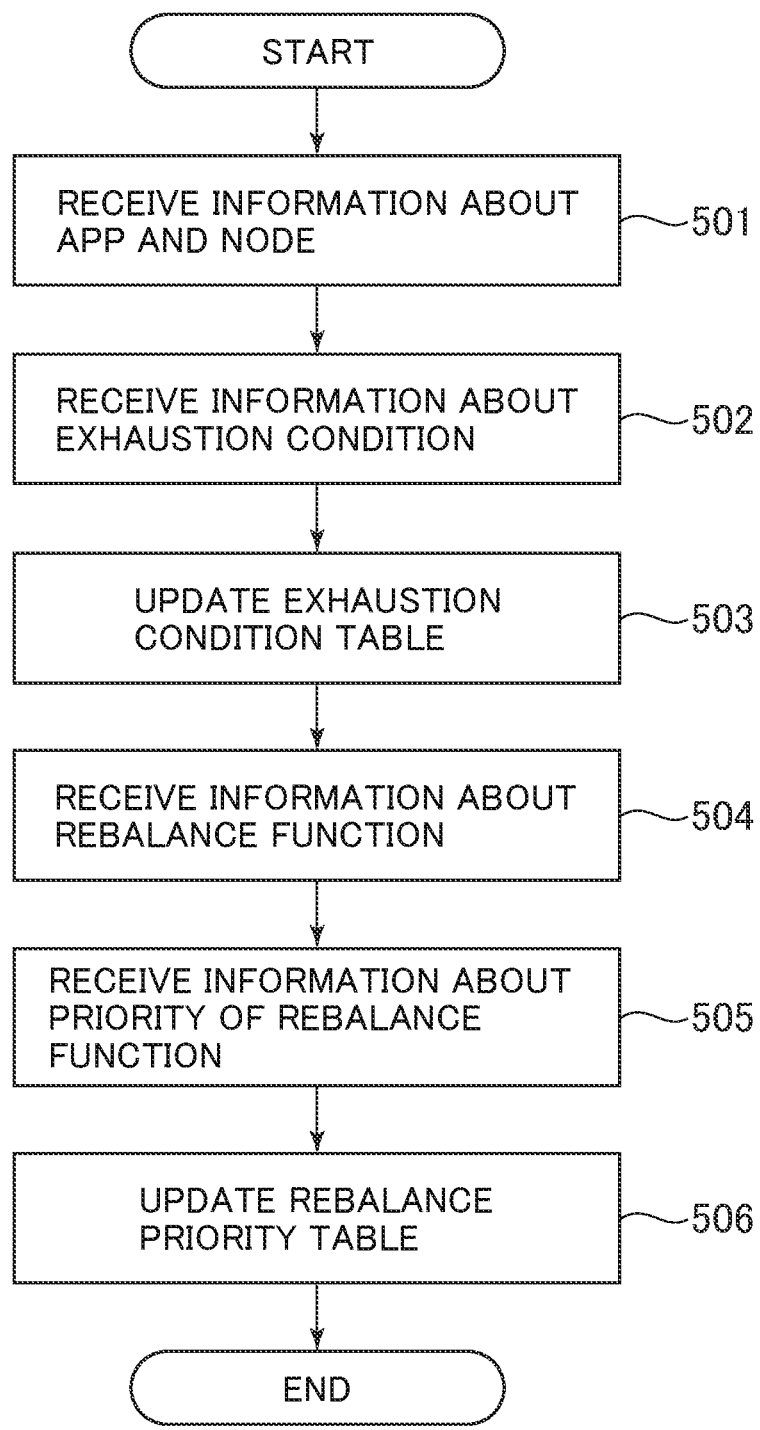

FIG. 10A

APP-SORTED REBALANCE PRIORITY TABLE 923

| REBALANCE ID (1011) | PRIORITY (1012) |
|---|---|
| r11 | 1 |
| r12 | 2 |

FIG. 10B

APP-SORTED EXHAUSTION CONDITION TABLE 924

| NODE ID (1021) | EXHAUSTION CONDITION (1022) |
|---|---|
| n11 | PHYSICAL RESIDUAL CAPACITY < 10 GB AND LOGICAL RESIDUAL CAPACITY > PHYSICAL RESIDUAL CAPACITY |
| n12 | PHYSICAL RESIDUAL CAPACITY < 10 GB AND LOGICAL RESIDUAL CAPACITY > PHYSICAL RESIDUAL CAPACITY |
| n13 | PHYSICAL RESIDUAL CAPACITY < 10 GB AND LOGICAL RESIDUAL CAPACITY > PHYSICAL RESIDUAL CAPACITY |

SYSTEM OF CONTROLLING DATA REBALANCE AND ITS METHOD

TECHNICAL FIELD

The invention relates to control of data rebalance.

BACKGROUND ART

Generally, high cost effectiveness is required for IT infrastructure. The data compression technique effective in reducing the bit cost in a storing device is considered to prevail in the future.

These days, a market of distributed applications which simplify small start and scale-out is expanding. As the distributed application, there is an application with data distributed to a plurality of servers and stored there.

There is a fear that the data may be stored intensively in a specified server, to cause the capacity shortage, thereby to fail in writing.

For example, according to Patent Literature 1, in a single storage device, data is rebalanced among the storing devices having compression functions.

CITATION LIST

Patent Literature

Patent Literature 1: WO2014/184941

SUMMARY OF INVENTION

Technical Problem

In the following description, an actual storing capacity of a storing device is referred to as "physical storing capacity", the total amount of the data actually stored in the storing device is referred to as "physically used capacity", and a difference between the physical storing capacity and the physically used capacity is referred to as "physical residual capacity". On the other hand, the storing capacity of a logical storing space provided by the storing device is referred to as "logical storing capacity", the total amount of the data stored in the logical storing space is referred to as "logically used capacity", and a difference between the logical storing capacity and the logically used capacity is referred to as "logical residual capacity".

In the following description, "physical capacity" is generally named to mean one of the physically used capacity, the physical residual capacity, a physical residual ratio (the ratio of the physical residual capacity in the physical storing capacity), and a physically used ratio (the ratio of the physically used capacity in the physical storing capacity); and "logical capacity" is generally named to mean one of the logically used capacity, the logical residual capacity, a logical residual ratio (the ratio of the logical residual capacity in the logical storing capacity), and a logically used ratio (the ratio of the logically used capacity in the logical storing capacity).

When a storing device has a compression function, the data amount recognized by an application is different from the compressed data amount stored in the storing device. As the result, the used capacity (logically used capacity) or the residual capacity (logical residual capacity) recognized by the application is different from the physically used capacity or the physical residual capacity.

As an application (for example, a distributed application), there is known an application having a rebalance function. Such an application, however, is to rebalance the data among the storing devices to equalize the logical capacities recognized by the application. Therefore, even if the logical capacities are equalized, the physical capacities are not equalized.

By using the technique of Patent Literature 1, equalization of the physical capacities is expected. As mentioned above, however, the application having a rebalance function is generally designed to rebalance the data to equalize the logical capacities recognized by the application. According to this, even when the physical capacities are once equalized, the application rebalances the data to equalize the logical capacities; therefore, it is difficult to maintain the equalization of the physical capacities.

This problem can happen also in another environment capable of executing a rebalance function of rebalancing data to equalize the logical capacities.

Solution to Problem

A data rebalance control system determines the instruction contents for an entity having a rebalance function, based on the capacity information including the information indicating a plurality of physical capacities corresponding to a plurality of storing devices which include at least one storing device having a compression function, coupled to one and more computers included in a computer system. The rebalance function of the entity is a function of rebalancing data so that the distribution of the plural logical capacities recognized by the entity, corresponding to the plural storing devices, may be a predetermined distribution. The determined instruction contents include a definition about the logical capacity distribution. The data rebalance control system transmits, to the entity, a rebalance instruction as an instruction to rebalance the data according to the above instruction contents.

Advantageous Effects of Invention

According to the invention, it is expected that even when a rebalance function of an entity rebalances data according to the determined logical capacity distribution, shortage of the physical residual capacity in a specified storing device can be avoided.

BRIEF DESCRIPTION OF DRAWINGS

FIG. 4A is a schematic view showing one example of a rebalance priority table shown in FIG. 3.

FIG. 4B is a schematic view showing one example of an exhaustion condition table shown in FIG. 3.

FIG. 4C is a schematic view showing one example of a node capacity table shown in FIG. 3.

FIG. 5 is a flow chart of the table setting processing.

FIG. 10A is a schematic view showing one example of an app-sorted rebalance priority table.

FIG. 10B is a schematic view showing one example of an app-sorted exhaustion condition table.

DESCRIPTION OF EMBODIMENTS

Figure 1:
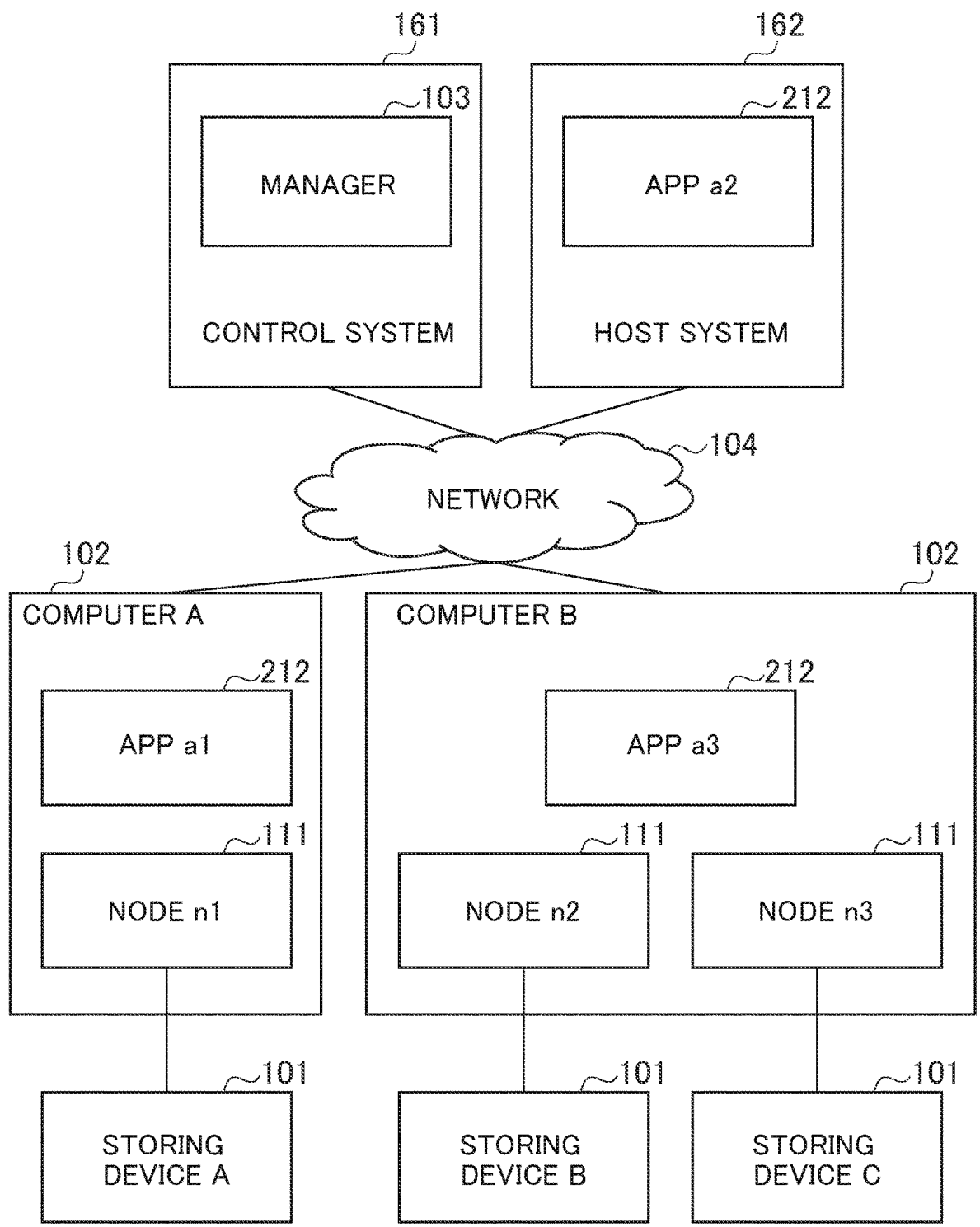
FIG. 1 is a block diagram showing the whole structure of an information system according to a first embodiment.

In the following description, "app" is the abbreviation of an application program.

In the following description, when elements of the same kind are not distinguished, a reference code is used, while when the elements of the same kind are distinguished, element ID is used. For example, when apps are not distinguished, they are referred to as "app 212"; while when the apps are distinguished, they are referred to as "app a1", "app a2", and "app a3".

Further, in the following description, "interface unit" includes one and more interfaces. The one and more interfaces may be one and more interface devices (for example, one and more Network Interface Cards (NIC)) of the same kind or interface devices of two and more different kinds (for example, NIC and Host Bus Adapter (HBA)).

In the following description, "storing unit" includes one and more memories. At least one memory may be a volatile memory or a non-volatile memory. The storing unit is mainly used for the processing by the processor unit.

In the following description, the "processor unit" includes one and more processors. At least one processor is typically a micro-processor such as Central Processing Unit (CPU). Each of the one and more processors may be a single core or a multi core. The processor may include a hardware circuit of performing a part or the whole of the processing.

In the following description, although the information is described with the expression of "xxx table", the information may be represented in whatever data structure. In short, the "xxx table" and "xxx information" can be used to show that the information does not depend on the data structure. Further, in the following description, the composition of each table is only one example; one table may be divided into two and more tables or all or a part of the two and more tables may be one table.

Further, in the following description, "computer system" includes one and more physical computers. At least one physical computer may execute a virtual computer (for example, Virtual Machine (VM)) or Software-Defined anything (SDx). As the SDx, for example, Software Defined Storage (SDS) (one example of the virtual storage device) or Software-defined Datacenter (SDDC) can be adopted.

Further, in the following description, "control system" may be formed by one and more computers. Specifically, for example, when a control computer has a display device and the control computer displays the information on its own display device, the control computer can be a control system. Further, for example, when the control computer (for example, a server) transmits the displaying information to a remote displaying computer (for example, a client) and the displaying computer displays the information (the control computer shows the information in the displaying computer), a system including at least the control computer of the control computer and the displaying computer may be the control system. The control system may include an interface unit, a storing unit, and a processor unit coupled to these. The interface unit may include at least one of a user interface unit and a communication interface unit. The user interface unit may include at least one I/O device of the one and more I/O devices (for example, input device (for example, keyboard and pointing device) and output device (for example, display device)) and those of the displaying computer. The communication interface unit may include one and more communication interface devices. That the computer in the control system "displays the displaying information" may be in the case where the displaying information is displayed on the display device included in the computer or where the computer transmits the displaying information to the displaying computer (in the latter case, the displaying computer displays the displaying information).

In the following description, although the processing unit (function) is sometimes described with the expression of "kkk unit", the processing unit may be realized by the processor unit executing one and more computer programs, or by one and more hardware circuits (for example, FPGA or Application Specific Integrated Circuit (ASIC)). When the processing unit is realized by processor unit executing the program, the predetermined processing is performed by properly using the storing resource (for example, memory) and/or the communication interface device (for example, communication port) and the like, and therefore, the processing unit may be at least a part of the processor unit. The processing described with the processing unit as a subject, may be the processing performed by the processor unit or a device including the processor unit. Further, the processor unit may include a hardware circuit of performing a part or all of the processing. The program may be installed from the program source into the processor. The program source may be, for example, a program distribution computer or a computer readable storing medium (for example, non-temporal storing medium). The description of the respective processing units is only one example; a plurality of processing units may be integrated into one processing unit or one processing unit may be divided into a plurality of processing units.

Further, in the following description, there is the case of describing the processing with "program" defined as subject; however, the program is executed by the processor unit to do predetermined processing while properly using at least one of the storing unit and the interface unit and therefore, the subject of the processing may be the processor unit (or the computer having the processor unit). The program may be installed from a program source into the computer. The program source may be, for example, a program distribution server or a computer readable storing media. Further, in the following description, two and more programs may be realized as one program or one program may be realized as two and more programs.

In the following description, at least one of the control system and the computer (at least one computer in the computer system) is one example of a data rebalance control system. The data rebalance control system may include at least one of the control system and at least one computer in the computer system.

Further, in the following description, the "physical capacity" typically means the physical residual capacity and the "logical capacity" typically means the logical residual capacity.

Hereinafter, some embodiments of the invention will be described with reference to the drawings.

First Embodiment

FIG. 1 shows the whole structure of an information system according to a first embodiment.

The information system includes a control system 161, a host system 162, a computer system, and a plurality of storing devices 101. The control system 161, the host system 162, and the computer system can make a communication through a network 104. The network 104 is, for example, Internet Protocol (IP) network.

The control system 161 executes a manager 103.

The host system 162 is one and more host computers, executing one and more apps 212 (for example, app a2).

The computer system includes one and more computers 102 (for example, computers A and B). One and more storing devices 101 (for example, storing devices A to C) are coupled to the one and more computers 102. The one and more computers 102 have the same number of nodes 111 (for example, nodes n1 to n3) as the number of storing devices 101. The node 111 may be one example of a computer program executed by the computer 102. The node 111 and the storing device 101 are in one-to-one correspondence. In other words, the respective nodes n1 to n3 correspond to the respective storing devices A to C.

Further, an app 212 is executed in at least one of the one and more computers 102. For example, assume that an app a1 is executed in the computer A, and an app a3 is executed in the computer B. The app 212 may be a Web application, middleware, or Operating System (OS). At least one of the computer programs other than the node 111 can correspond to the app 212 at least in one computer 102. In this embodiment, at least the app a1 or a3 of the apps a1 to a3 may be a distributed application. Specifically, at least one of the apps a1 and a3 recognizes, for example, the logical storing spaces respectively provided by the storing devices A to C, and at least one of the apps a1 and a3 has a rebalance function of rebalancing data so that the distribution of the logical capacities (the logical capacities recognized by the app) may be a predetermined distribution in a plurality of logical storing spaces.

Figure 2:
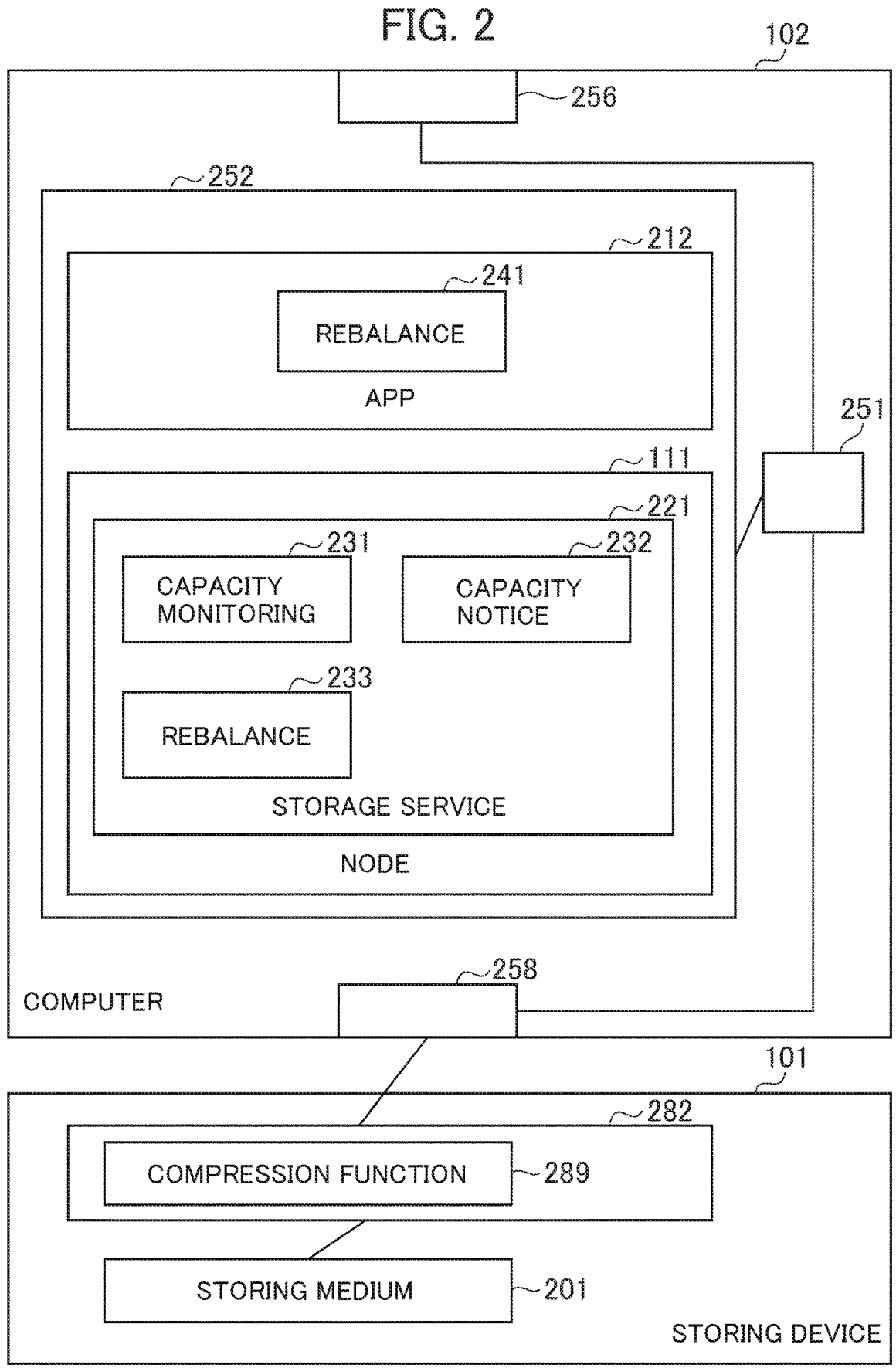
FIG. 2 is a block diagram showing the structure of a computer and a storing device shown in FIG. 1.

FIG. 2 shows the structure of the storing device 101 and the computer 102.

At least one of the one and more storing devices 101 has a compression function and in this embodiment, each of the storing devices 101 has the compression function 289.

The storing device 101 includes a storing medium. 201 and a device controller 282 as a controller of controlling data Input/Output (I/O) for the storing medium 201.

Each of the storing devices 101 is typically a physically non-volatile storing device, for example, Hard Disk Drive (HDD) or Solid State Drive (SSD). Therefore, the storing medium 201 is, for example, a hard disk or a flash memory (one and more flash memory chips). In this embodiment, the respective storing devices 101 are SSDs.

The device controller 282 is coupled to the storing medium 201. Further, the device controller 282 is coupled to the computer 102. The device controller 282 may have a computer resource such as a processor and a memory. The device controller 282 receives the I/O command from the computer 102 and writes or reads data for the storing medium 201 according to the I/O command. The device controller 282 can control the physical storing capacity, the physically used capacity, and the physical residual capacity of the storing medium 201. The device controller 282 can provide the logical storing space based on the storing medium 201 to the computer 102. The device controller 282 has the compression function 289. Further, the compression function 289 may be realized by the processor executing a computer program, or realized as a hardware circuit (for example, Application Specific Integrated Circuit (ASIC) or Field-Programmable Gate Array (FPGA)).

The computer 102 includes a front end interface device (FE I/F) 256, a back end interface device (BE I/F) 258, a memory 252, and a processor 251 coupled to these.

The FE I/F 256 is coupled to the network 104. The BE I/F 258 is coupled to the device controller 282 of the storing device 101. The FE I/F 256 and the BE I/F 258 are one example of the interface unit.

The memory 252 is one example of the storing unit and stores the node 111 and one and more apps 212. The node 111 and the app 212 are executed by the processor 251.

The node 111 provides the logical storing space of the storing device 101 corresponding to the same node 111 to the app 212 within the computer 102 which executes the same node 111. The node 111 may provide the logical storing space of the storing device 101 corresponding to the same node 111 to the app 212 outside of the computer 102 which executes the same node 111. Upon receipt of the I/O request for the logical storing space, the node 111 writes or reads data for the storing device 101 corresponding to the same node 111 (transmits the I/O command to the storing device 101), according to the I/O request. The node 111 can transfer the data to be written in the corresponding storing device 101 (I/O request of the write target data) to the node 111 coupled to the other storing device 101 (for example, the node 111 within the other computer 102), for example, to keep the data redundancy. The transferred write target data may be stored in the other storing device 101. The node 111 may be, for example, Software Defined Storage (SDS). The node 111 includes a storage service 221.

The storage service 221 corresponds to a virtual storage controller as a virtual controller which receives the I/O request and writes or reads data for the storing device 101 according to the I/O request. In short, the storage service 221 or the node 111 including the storage service 221 is one example of the storage control function. The storage service 221 includes a capacity monitoring function 231, a capacity notice function 232, and a rebalance function 233. The capacity monitoring function 231 monitors the logical capacity and the physical capacity of the storing device 101 corresponding to the node 111 including this function 231 (for example, checks the above regularly). The capacity notice function 232 notifies the manager 103 of the logical capacity and the physical capacity specified by the capacity monitoring function 231. The rebalance function 233 rebalances the data.

The app 212 has a rebalance function 241. The rebalance function 241 rebalances the data.

The rebalance functions 233 and 241 may have the same functions or different functions. In the latter case, the rebalance function 233 performs the rebalance according to a first rebalance method and the rebalance function 241 performs the rebalance according to a second rebalance method. At least the rebalance function 241 (the rebalance function 241 belonging to the app 212) of the rebalance functions 233 and 241 is formed to rebalance the data according to the logical capacity distribution (for example, to equalize the logical capacities) defined in the rebalance function 241, because generally the app 212 cannot grasp the physical capacity.

Figure 3:
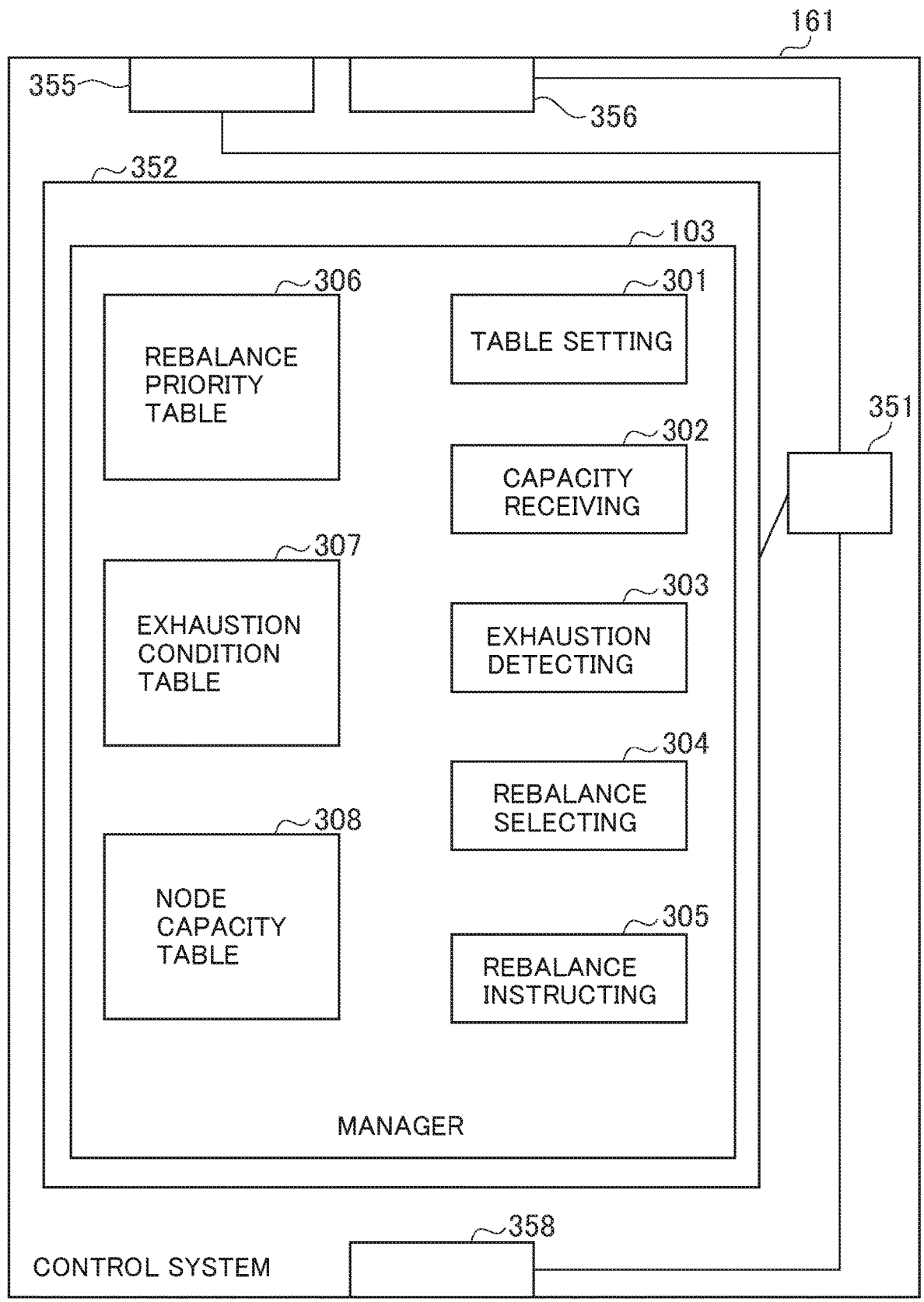
FIG. 3 is a block diagram showing the structure of a manager shown in FIG. 1.

FIG. 3 shows the structure of the control system 161.

The control system 161 includes an input device 355, an output device 356, an interface device (I/F) 358, a memory 352, and a processor 351 coupled to these.

The input device 355 is, for example, a keyboard and a pointing device. The output device 356 is, for example, a display device such as liquid crystal display. The input device 355 and the output device 356 may be integrated, for example, as a touch panel.

The I/F 358 is coupled to the network 104. The I/F 358 is one example of the interface unit.

The memory 352 is one example of the storing unit and stores the manager 103. The manager 103 is executed by the processor 351.

The manager 103 is one example of a rebalance control function with a rebalance function (for example, entity such as app) and a storage control function (in the embodiment, the storage service 221) coordinated with each other. This "coordination" means that the capacity information including the information indicating the capacity (logical capacity and physical capacity) is received from the storage control function and that a rebalance instruction is transmitted to the rebalance function based on the received capacity. According to this, the rebalance performed by the entity which cannot grasp the physical capacity can be controlled based on the physical capacity. The manager 103 includes a table setting function 301, a capacity receiving function 302, an exhaustion detecting function 303, a rebalance selecting function 304, and a rebalance instructing function 305. The manager 103 controls a rebalance priority table 306, an exhaustion condition table 307, and a node capacity table 308.

The table setting function 301 sets and updates the tables 306 to 308. The capacity receiving function 302 receives the capacity information as the information indicating the logical capacity and the physical capacity of the storing device 101 from the node 111. The exhaustion detecting function 303 detects the capacity exhaustion. The rebalance selecting function 304 selects a rebalance function. The rebalance instructing function 305 instructs the rebalance execution for the selected rebalance function.

Hereinafter, the rebalance priority table 306, the exhaustion condition table 307, and the node capacity table 308 will be described.

FIG. 4A shows one example of the rebalance priority table 306.

The rebalance priority table 306 holds the information about the rebalance function. The rebalance priority table 306 holds the information such as rebalance ID 421 as the ID for identifying a rebalance function, app ID 422 as the ID for identifying an app having the rebalance function, and priority 423 indicating the priority of the rebalance function, for every rebalance function. In this embodiment, according as the value of the priority 423 gets smaller, the priority becomes higher. When the subject having the rebalance function is the storage service 221, the ID of the storage service 221 may be registered as the app ID.

For example, with respect to the first line, the priority of the rebalance function r1 (rebalance function identified by the rebalance ID "r1") is "2", and each of the apps a2 and a3 (the app 212 identified by the app IDs "a2" and "a3") has the rebalance function r1. Further, with respect to the first line and the second line, when performing the rebalance in the node where the app a1 and the app a3 operate, the priority of the rebalance function r1 belonging to the app a3 is "2" and the priority of the rebalance function r2 belonging to the app a1 is "1"; therefore, the rebalance function r2 of the app a1 having the priority "1" is preferentially performed.

FIG. 4B shows one example of the exhaustion condition table 307.

The exhaustion condition table 307 holds the information about the exhaustion condition. The exhaustion condition table 307 holds the information such as node ID 431 as the ID for identifying a node 111, app operation 432 indicating the app 212 in which data is stored in the storing device 101 corresponding to the above node 111 and a list of the nodes 111 corresponding to the storing device 101 where the app 212 stores the data, and exhaustion condition 433 indicating the exhaustion condition as the definition of the capacity exhaustion of the storing device 101 corresponding to the above node 111, for every node 111. The app operation 432 is a combination of the app ID and the node IDs identifying the nodes 111 corresponding to the storing device 101 to store the date of the app corresponding to the app ID.

For example, with respect to the first line, the app a1 and the app a3 are to store data in the storing device 101 corresponding to the node n1 (the node 111 identified by the node identifier "n1"). The app a1 to store the data in the above storing device 101 stores the data also in the storing devices 101 corresponding to the node n1, the node n2, and the node n3. Further, the app a3 to store the data in the above storing device 101 stores the data also in the storing devices 101 corresponding to the node n1, the node n2, and the node n3. The storing device 101 corresponding to the node n1 is determined to be exhausted in capacity when the physical residual capacity of the storing device 101 is less than 10 GB and when the physical residual capacity is less than the logical residual capacity.

The "logical capacity" is the logically used capacity or the logical residual capacity, the capacity recognized by the app 212. The "physical capacity" is the physically used capacity or the physical residual capacity, the capacity recognized by the storing device 101. The data which the app 212 stores in the storing device 101 is compressed by the compression function 289 of the storing device 101, and thereafter, stored in the storing medium 201 of the storing device 101. In short, the logically used capacity can be referred to as the capacity before the compression and the physically used capacity can be referred to as the capacity after the compression.

The exhaustion condition may be different in two and more storing devices 101 (two and more nodes 111) of a plurality of storing devices 101 (a plurality of nodes 111). In short, the different exhaustion condition may be adopted depending on the storing device 101. The exhaustion condition is one example of the condition of requiring the rebalance execution. By adopting the different exhaustion condition depending on the storing device 101, flexible data rebalance, for example, data rebalance at a proper timing for the storing device 101 (node 111) can be expected.

FIG. 4C shows one example of the node capacity table 308.

The node capacity table 308 holds the information about the capacity controlled by the node 111. The node capacity table 308 holds the information such as the node ID 441 as the ID for identifying a node 111, the logically used capacity 442 indicating the logically used capacity of the logical storing capacity of the storing device 101 corresponding to the node 111, the logical residual capacity 443 indicating the logical residual capacity of the logical storing capacity of the storing device 101 corresponding to the node 111, the physically used capacity 444 indicating the physically used capacity of the physical storing capacity of the storing device 101 corresponding to the node 111, and the physical residual capacity 445 indicating the physical residual capacity of the physical storing capacity of the storing device 101 corresponding to the node 111, for every node 111.

For example, with respect to the first line, of the logical storing capacity of the storing device 101 corresponding to the node n1, 400 GB is the logically used capacity and 200 GB is the logical residual capacity. Of the physical storing capacity of the storing device 101, 60 GB is the physically used capacity and 140 GB is the physical residual capacity.

According to the node capacity table 308 in FIG. 4C, although the physical storing capacity of every storing device 101 is the same (200 GB), the storing devices 101 having different physical storing capacities may be mixed.

FIG. 5 is a flow chart of the table setting processing executed by the manager 103. The processing is executed when a user (for example, a controller) updates the setting.

The table setting function 301 receives the input of the information about the app 212 (for example, the app ID) and the information about the node 111 (for example, the node ID) corresponding to the storing device 101 used by the app 212, via the input device 354, from a user (Step 501).

The table setting function 301 receives the input of the information about the exhaustion condition of the storing device 101 corresponding to the node 111, via the input device 355 from a user (Step 502).

The table setting function 301 registers the information received in Step 501 and Step 502 into the exhaustion condition table 307; in short, updates the exhaustion condition table 307 (Step 503). Here, since the storing device 101 and the node 111 are in one-to-one correspondence, the table setting function 301 can uniquely determine the node 111 from the information about the storing device 101. As the exhaustion condition 433, an initial value may be previously registered (Step 502 may be skipped).

The table setting function 301 receives the information about the rebalance function 241 belonging to the app 212 (for example, the rebalance ID and the app ID) via the input device 355 from a user (Step 504).

The table setting function 301 receives the information about the priority of the rebalance function 241 (for example, the value as the priority) via the input device 355 from a user (Step 505).

The table setting function 301 registers the information received in Step 504 and Step 505 in the rebalance priority table 306; in short, updates the rebalance priority table 306 (Step 506). The app ID and the rebalance ID may be previously registered in the table 306 (Step 504 may be skipped).

Figure 6:
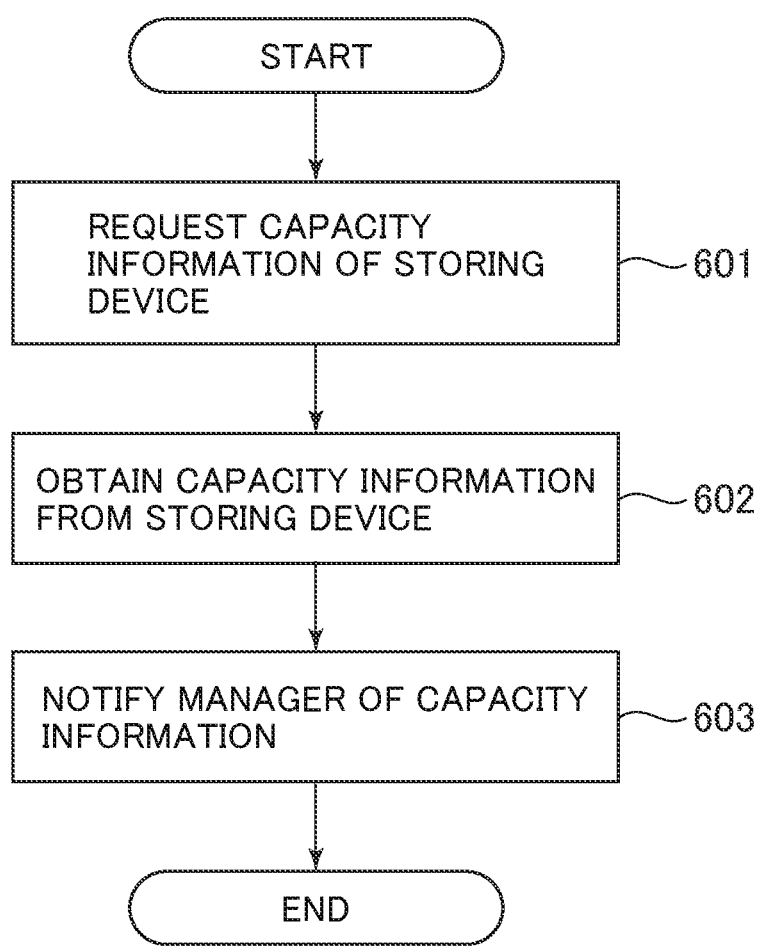
FIG. 6 is a flow chart of the capacity monitoring processing.

FIG. 6 is a flow chart of the capacity monitoring processing executed by the storage service 221. The processing is, for example, regularly performed. In the description of FIG. 6, the node 111 including the storage service 221 is referred to as "target node 111".

The capacity monitoring function 231 requests the capacity information of the storing device 101 corresponding to the target node 111 (Step 601). The capacity monitoring function 231 receives the information indicating the logically used capacity, the logical residual capacity, the physically used capacity, and the physical residual capacity of the storing device 101 as the capacity information from the storing device 101 (Step 602).

The capacity notice function 232 notifies the manger 103 of the capacity information received by the capacity monitoring function 231 in Step 602 (Step 603).

The manager 103 executes the following capacity information updating processing, every time of receiving the capacity information. Specifically, the capacity receiving function 302 registers the received capacity information (the information indicating the logically used capacity, the logical residual capacity, the physically used capacity, and the physical residual capacity) in the node capacity table 308.

Figure 7:
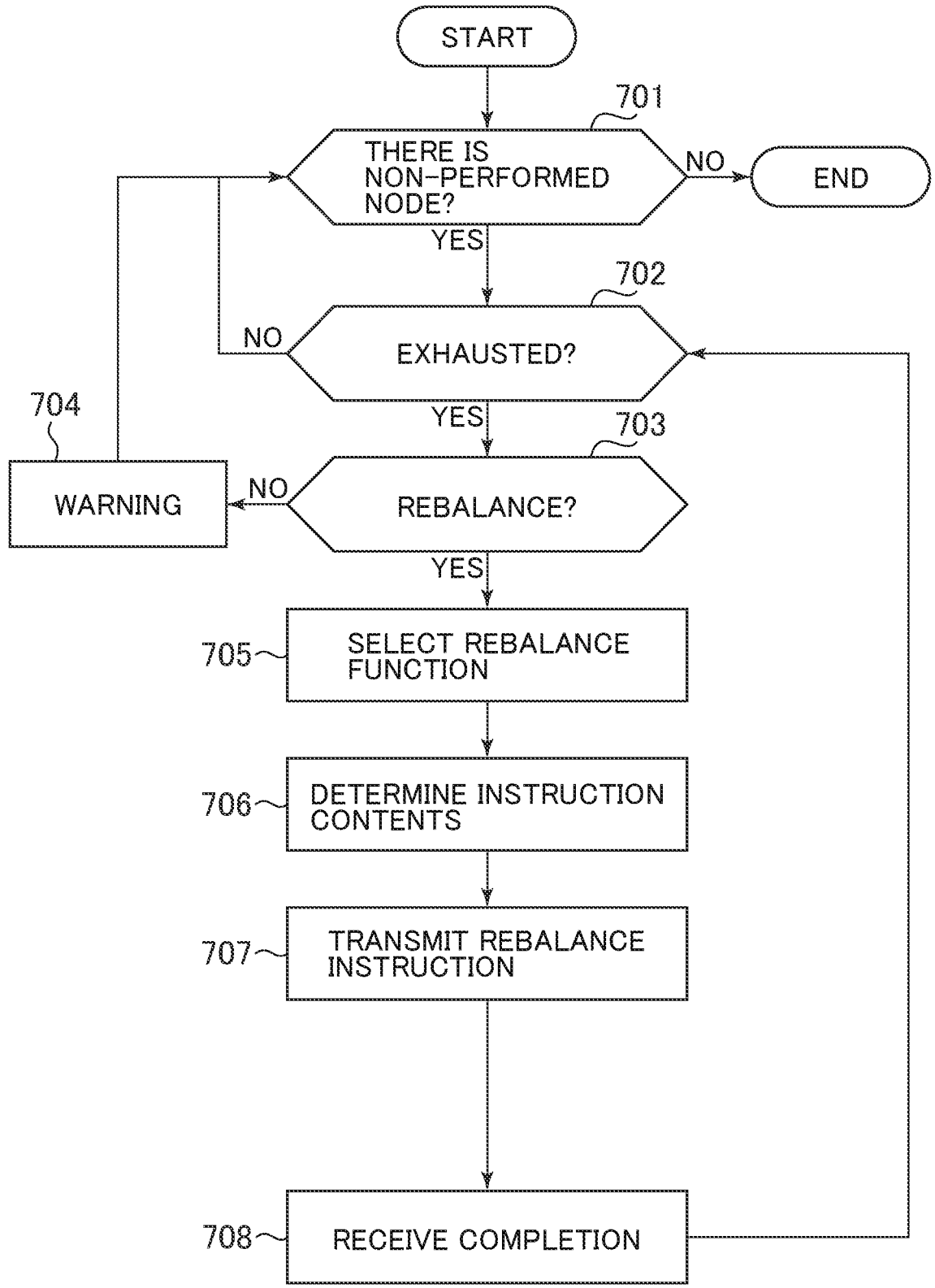
FIG. 7 is a flow chart of the rebalance control processing.

FIG. 7 is a flow chart of the rebalance control processing executed by the manager 103. The processing is, for example, regularly performed.

When there is a non-performed node in which the exhaustion detecting processing is not performed (Step 701: YES), the exhaustion detecting function 303 determines whether or not the capacity of the storing device corresponding to the non-performed node is exhausted, referring to the exhaustion condition table 307 and the node capacity table 308 (Step 702).

For example, in the exhaustion condition table 307 of FIG. 4B, the node n1 is determined to be exhausted when the physical residual capacity is less than 10 GB and the physical residual capacity is less than the logical residual capacity, according to the exhaustion condition of the node n1. In the node capacity table 308, as for the node n1, the logical residual capacity is 200 GB and the physical residual capacity is 140 GB. The exhaustion condition of the node n1 is not satisfied and therefore, any exhaustion is not detected in the node n1.

In Step 702, when any exhaustion is not detected (Step 702: NO), the operation is returned to Step 701. In Step 701, when the exhaustion detecting processing is performed in all the nodes (Step 701: NO), the rebalance control processing is completed.

Further, for example, in the exhaustion condition table 307, the node n2 is determined to be exhausted according to the exhaustion condition of the node n2, when the physical residual capacity is less than 10 GB and the physical residual capacity is less than the logical residual capacity. In the node capacity table 308, the logical residual capacity in the node n2 is 200 GB and the physical residual capacity is 8 GB. Since the exhaustion condition is satisfied in the node n2, exhaustion is detected in the node n2.

When the exhaustion is detected in Step 702 (Step 702: YES), the rebalance selecting function 304 searches for the rebalance method with reference to the exhaustion condition table 307 and the rebalance priority table 306 (Step 703). For example, when the exhaustion is detected in the node n2 in Step 702, the rebalance selecting function 304 finds that the app a1 and the app a3 store the data in the storing device 101 corresponding to the node n2, from the app operation 432 of the exhaustion condition table 307. Further, from the rebalance priority table 306, it is found that the app a1 can perform the rebalance function r2 and that the app a3 can perform the rebalance function r1 and the rebalance function r3. In the rebalance control processing, the rebalance function which is performed on the app in the node n2 is excluded from the search target in this step. When detecting this exhaustion, the operation proceeds to the search of the rebalance function and it is possible to avoid the rebalance function from keeping running until rebalance unnecessary situation where no exhaustion is detected.

When any rebalance function executable in Step 703 is not found (Step 703: NO), the rebalance selecting function 304 notifies a user of a warning of capacity shortage (for example, displays the warning to the output device 356) (Step 704) and the operation returns to Step 701.

When the rebalance function executable in Step 703 is found (Step 703: YES), the rebalance selecting function 304 selects the rebalance function to be executed, with reference to the rebalance priority table 306 (Step 705). For example, according to the above-mentioned example in Step 703, the rebalance function r1 can be performed on the app a3, the rebalance function r2 can be performed on the app a1, and the rebalance function r3 can be performed on the app a3. With reference to the priority 423 of the rebalance priority table 306, it is found that the priority of the rebalance function r1 is "2", the priority of the rebalance function r2 is "1", and the priority of the rebalance function r3 is "3". In short, it is found that the priority of the rebalance function r2 is the highest. Therefore, the rebalance selecting function 304 selects the rebalance function r2 belonging to the app a1. According to this, in the case of being able to perform a plurality of rebalance functions, preference can be given to the rebalance function having the highest priority.

For example, the rebalance function (for example, the app having the rebalance function) selected in Step 705 is typically to store the data of the amount according to the storage ratio corresponding to the nodes 111, in the respective nodes 111 (storing devices 101). The stored data is the data not compressed. In short, the rebalance function selected in Step 705 is typically to rebalance the data so that the logical capacities corresponding to the respective nodes 111 may be the logical capacities according to the storage ratio defined for the rebalance function.

Then, with reference to the node capacity table 308, the rebalance instructing function 305 determines the instruction contents to equalize the physical capacities (Step 706), as the instruction contents of the rebalance instruction for the rebalance function selected in Step 705. For example, with reference to the node capacity table 308, the rebalance instructing function 305 may calculate the compression ratio of the storing device corresponding to the node where the app performing the rebalance function selected in Step 705 stores the data, for example, based on the logically used capacity and the physically used capacity corresponding to the above node, multiply the current storage ratio of the data in the nodes by the inverse number of the compression ratio, and determine the instruction contents including the definition about the distribution of the storage ratio thus determined. Alternatively, the rebalance instructing function 305 may determine the instruction contents including the definition of the storage ratio distribution meaning that the storage ratio of the node having the lowest compression ratio (or, for example, the node having the smallest physical residual capacity) is reduced by a constant number and that the storage ratio of the node having the highest compression ratio (or, for example, the node having the largest physical residual capacity) is increased by a constant number. As mentioned above, the instruction contents included in the rebalance instruction include the definition about the logical capacity distribution for equalizing the plural physical capacities. Here, "equalization of the physical capacities" is one example of avoiding exhausting the physical residual capacity of at least one storing device (for example, getting zero) of the plural storing devices 101.

The rebalance instructing function 305 transmits the rebalance instruction that is the instruction to rebalance the data according to the instruction contents determined in Step 706, to the app 212 having the rebalance function selected in Step 705 (Step 707). In reply to this rebalance instruction, the rebalance function 241 within the app 212 having received the above instruction performs the rebalance of the data according to the instruction contents included in the above rebalance instruction.

Here, the data rebalance typically includes that the rebalance function (a function receiving the rebalance instruction) transfers the data among the nodes 111 (storing devices 101) so that the capacities may be the changed distribution according to the rebalance instruction (the storage ratio). According to the data transfer, the ratio of the logical capacities approaches the changed distribution and as the result, the physical capacities are equalized, among the nodes 111.

Upon completion of the rebalance (for example, when a difference between the changed storage ratio according to the instruction contents and the ratio of the logical capacities is a predetermined value and less), the rebalance function 241 returns the rebalance completion to the manager 103.

The rebalance instructing function 709 receives the notification of the rebalance completion from the app 212 (the rebalance function 241) (Step 708). After receiving the notification, the operation is returned to Step 702 and the exhaustion detecting function 303 determines whether or not the above node is still exhausted in capacity. When this determination result is false (Step 702: NO), in short, when the capacity exhaustion is resolved in the node, the operation is returned to Step 701.

As mentioned above, the first embodiment has been described. According to the embodiment, the manager 103 coordinates the node 111 of monitoring the physical capacity of the storing device 101 with the rebalance function (app 212) of rebalancing the data (controlling the logical capacities) according to the defined distribution (storage ratio). The manager 103 obtains the information indicating the physical capacities from all the nodes 111, and controls the rebalance (distribution of the data amount) performed by the rebalance function to equalize the physical capacities of all the nodes 111. According to this, even when any rebalance function rebalances the data according to the distribution (storage ratio) defined in the rebalance function, it is expected that the equalization of the physical capacities is kept (in other words, the physical residual capacity shortage is avoided).

Here, the instruction contents determined in Step 706 in FIG. 7 may be various depending on the selected rebalance function. For example, as for the first rebalance function, the instruction contents may include acquisition of some logical capacity from the node which is short of the physical residual capacity but has the sufficient logical residual capacity and addition of the acquired logical capacity to the node which has the sufficient physical residual capacity but is short of the logical residual capacity. Further, for example, as for the second rebalance function, the instruction contents may include distribution of the logical residual capacity of the node having an excessively larger logical residual capacity compared with the physical residual capacity, to the other node, and addition of the logical residual capacity of the node having a smaller physical residual capacity to the logical residual capacity of the node having a larger physical residual capacity.

Second Embodiment

A second embodiment will be described. At that time, a difference from the first embodiment is mainly described and the common point with the first embodiment is not described or simply described.

Figure 8:
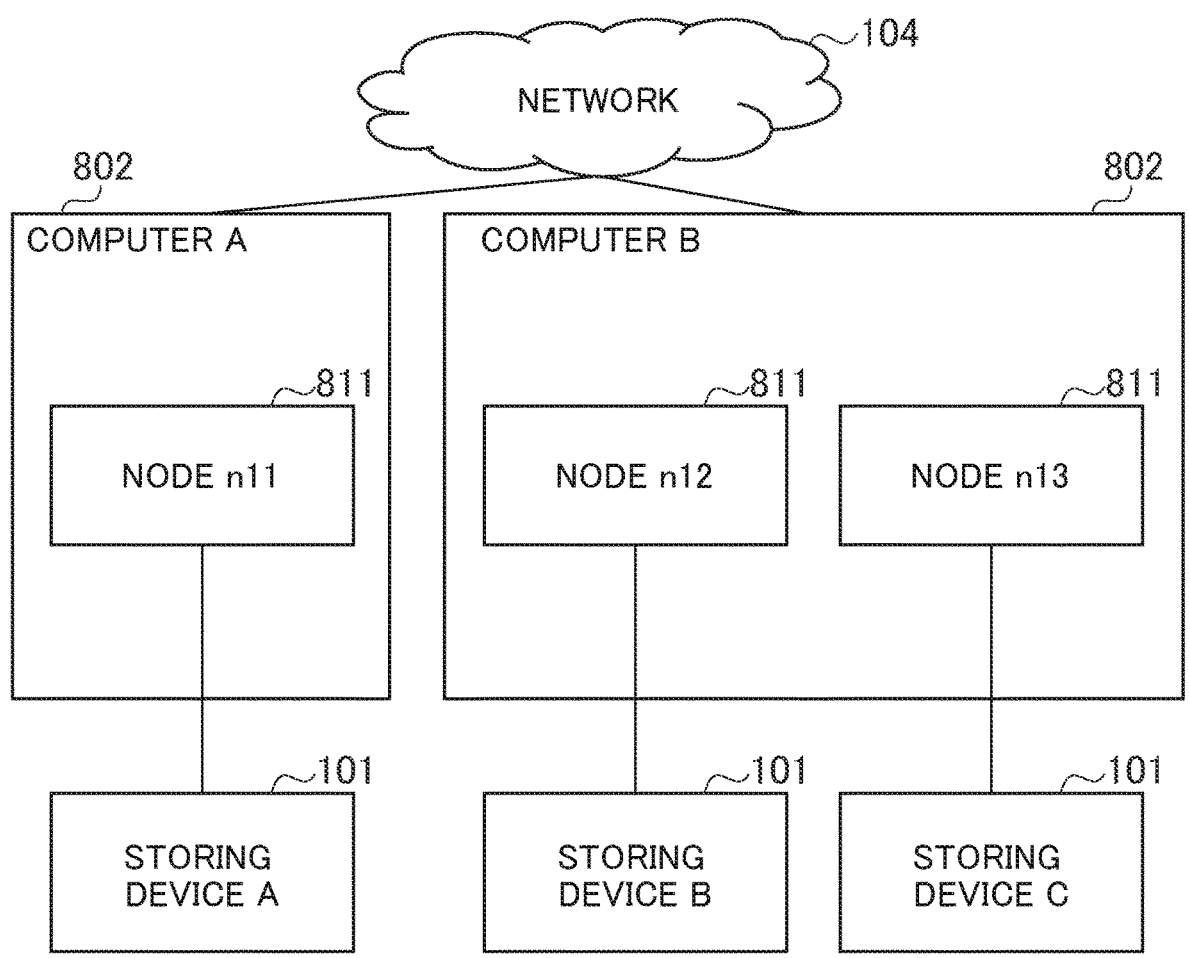
FIG. 8 is a block diagram showing the structure of an information system according to a second embodiment.

FIG. 8 shows the whole structure of an information system according to the second embodiment.

The information system includes a plurality of storing devices 101 and a computer system including one and more computers 802 with the plural storing devices 101 coupled. When there is one computer 802, the network 104 is not used.

The one and more computers 802 include a plurality of nodes 111 (for example, the nodes n11, n12, and n13) respectively corresponding to the plural storing devices 101 (for example, storing devices A to C).

The second embodiment is different from the first embodiment in that the manager is not included in the structure of the information system and that the app has an app-sorted manager described later.

Figure 9:
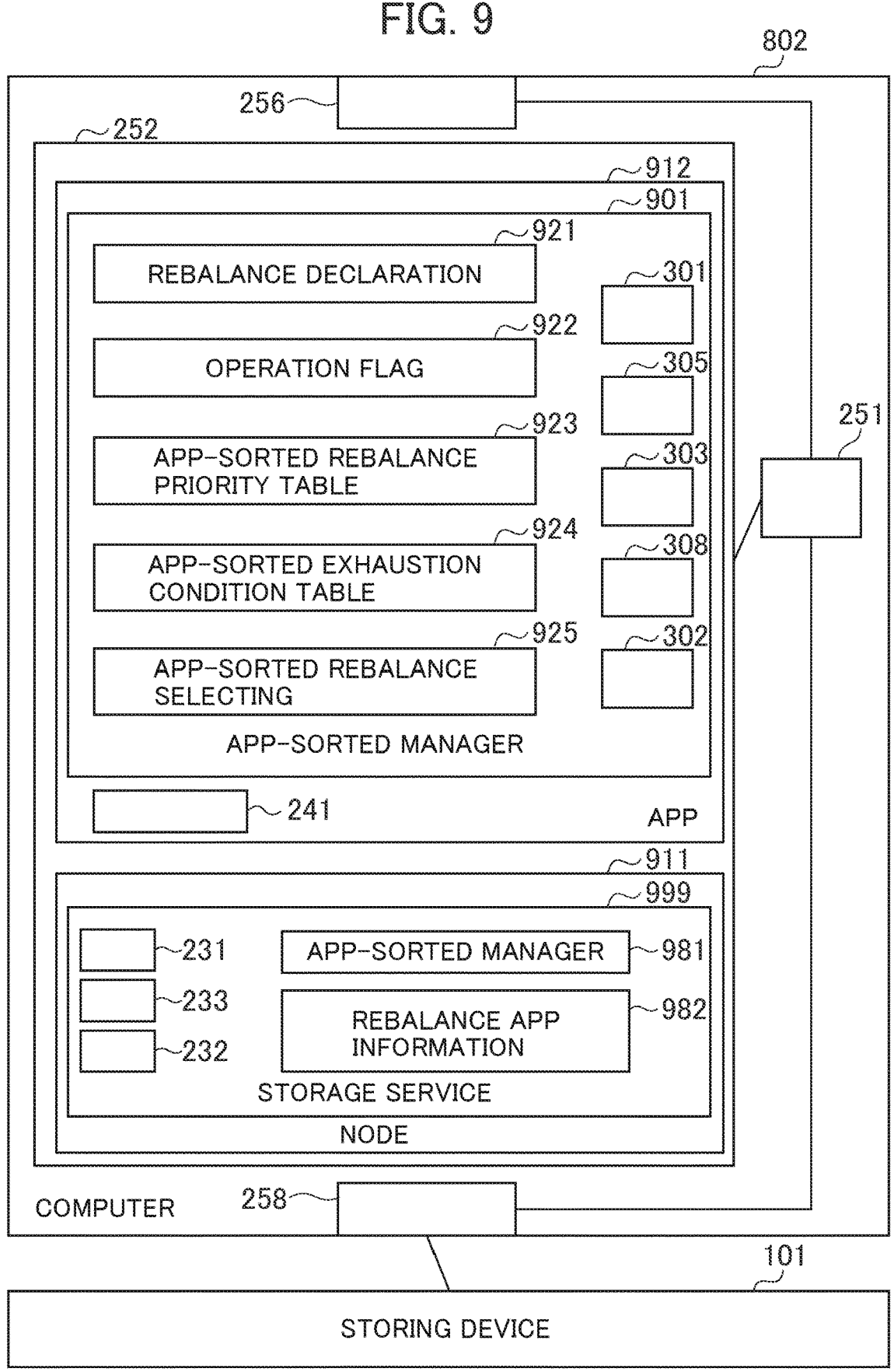
FIG. 9 is a block diagram showing the structure of a computer according to the second embodiment.

FIG. 9 shows the structure of the computer 802 according to the second embodiment.

The memory 252 of the computer 802 stores an app 912 other than a node 911. The node 911 and the app 912 are executed by the processor 251.

The app 912 includes an app-sorted manager 901 other than the rebalance function 241.

The app-sorted manager 901 includes the table setting function 301, the rebalance instructing function 305, the exhaustion detecting function 303, the capacity receiving function 302, a rebalance declaration function 921, and an app-sorted rebalance selecting function 925. The app-sorted manager 901 controls the node capacity table 308, an operation flag 922, an app-sorted rebalance priority table 923, and an app-sorted exhaustion condition table 924.

The rebalance declaration function 921 performs the declaration about whether or not the app 912 including the app-sorted manager 901 performs rebalance.

The operation flag 922 is indicated, for example, in a binary value. The operation flag 922 indicates whether or not the above app-sorted manager 901 operates. In other words, whether or not to perform the rebalance control is controlled in every app 912.

The node 911 has a storage service 999.

The storage service 999 includes the capacity monitoring function 231, the capacity notice function 232, the rebalance function 233, and an app-sorted manager 981. The storage service 999 controls rebalance app information 982.

The app-sorted manager 981 has the same function as the app-sorted manager 901.

The rebalance app information 982 includes the ID of the app 912 including the app-sorted manager 901.

There is the case where the computer system includes a plurality of computers 802 and the app 912 operates dispersedly by the plural computers 802. At this time, only the representative app 912 in a specified computer 802 may have the app-sorted manager 901 or the respective apps 912 may have the above and operate together in cooperation.

In this embodiment, assume that the representative app 912 has the app-sorted manager 901. The app-sorted manager 901 controls the app-sorted rebalance priority table 923 and the app-sorted exhaustion condition table 924.

FIG. 10A shows one example of the app-sorted rebalance priority table 923.

The app-sorted rebalance priority table 923 holds the information such as rebalance ID 1011 as the ID of the rebalance function 241 and priority 1012 indicating the priority of the rebalance function, for every rebalance function 241 belonging to the app 912.

For example, according to the first line, the priority of the rebalance function r11 is "1". This is why the rebalance function r11 is preferentially performed when the exhaustion occurs in the node storing the data of the app 912.

FIG. 10B shows one example of the app-sorted exhaustion condition table 924.

The app-sorted exhaustion condition table 924 holds the information such as node ID 1021 as the ID for identifying a node and the exhaustion condition 1022 indicating the exhaustion condition corresponding to the node, for every node corresponding to the storing device which stores the data of the app 912.

For example, according to the first line, the storing device 101 corresponding to the node n11 is determined to be exhausted in capacity when the physical residual capacity of the storing device 101 is less than 10 GB and the physical residual capacity is less than the logical residual capacity.

The app-sorted manager 901 performs the table setting processing. The table setting processing according to the second embodiment includes receiving information indicating "operation" or "non-operation" of the rebalance function of the app from a user and registering (updating) the information as the operation flag 922, in addition to Steps 501 to 506 shown in FIG. 5 (for example, after performing Step 506).

Figure 11:
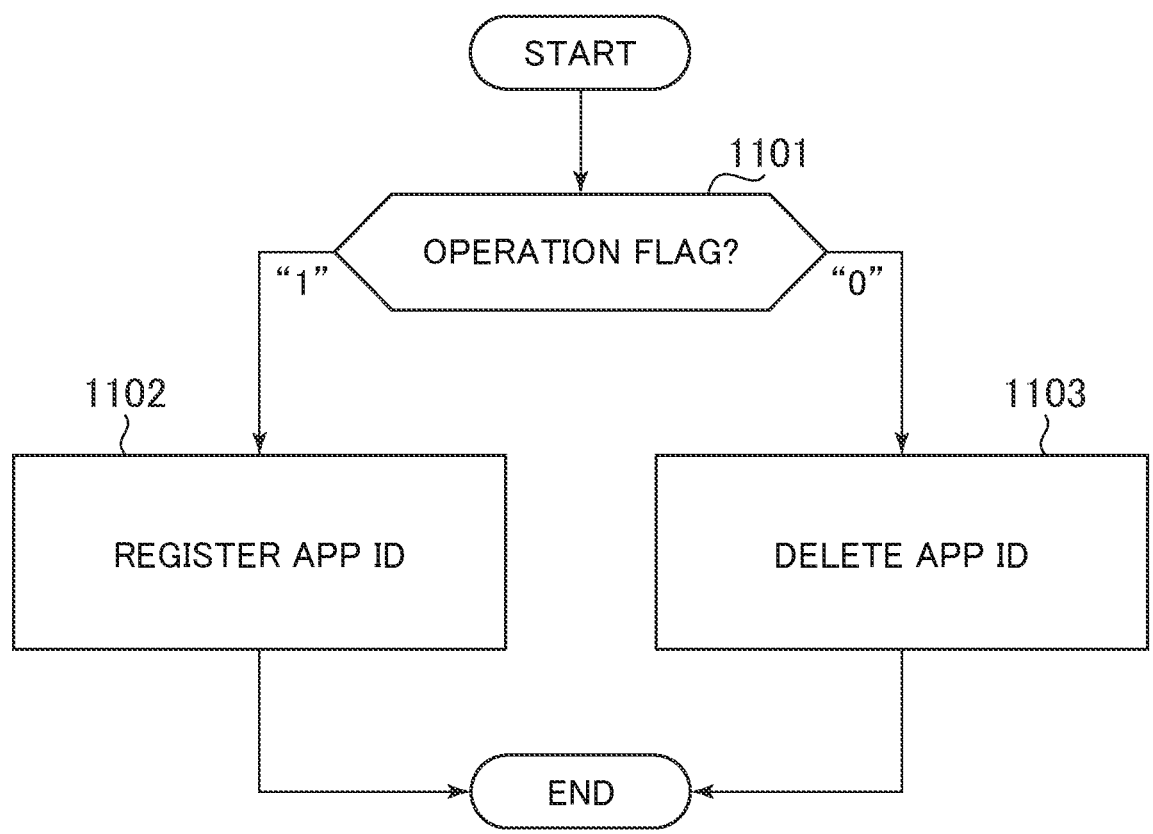
FIG. 11 is a flow chart of the rebalance declaration processing.

FIG. 11 is a flow chart of the rebalance declaration processing performed by the app-sorted manager 901. This processing is performed when the value of the operation flag 922 is changed.

When the operation flag 922 is changed to "1" ("operation") (Step 1101: "1"), the rebalance declaration function 921 declares the execution of the rebalance, that is, registers the app ID of the app 912 in the rebalance app information 982 of the storage service 999 (Step 1102).

When the operation flag 922 is changed to "0" ("non-operation") (Step 1101: "0"), the rebalance declaration function 921 declares the non-execution of the rebalance, that is, deletes the app ID of the app 912 from the rebalance app information 982 of the storage service 999 (Step 1103).

The storage service 999 regularly performs the capacity monitoring processing. The capacity monitoring processing according to the second embodiment includes Step 601 and Step 602 shown in FIG. 6. The storage service 999 notifies the app-sorted manager 901 belonging to the app 212 identified from the rebalance app information 982 of the capacity information obtained through Step 602.

The capacity information updating processing according to the second embodiment is the same as that of the first embodiment.

The app-sorted manager 901 regularly performs the rebalance control processing. The rebalance control processing according to the second embodiment includes Step 701, Step 704, Step 706, Step 708, and Step 709 shown in FIG. 7.

Specifically, when detecting a node with the rebalance processing not performed there in Step 701, the exhaustion detecting function 303 determines whether or not the exhaustion occurs in the above node, with reference to the app-sorted exhaustion condition table 924 and the node capacity table 308. When the determination result is true, the app-sorted rebalance selecting function 925 searches for the rebalance functions, with reference to the app-sorted exhaustion condition table 924 and the app-sorted rebalance priority table 923. When the rebalance function is found, the app-sorted rebalance selecting function 925 selects the rebalance function to perform, with reference to the app-sorted rebalance priority table 923.

After selecting the rebalance function, Step 706 is performed. After performing Step 706, the rebalance instructing function 305 issues the rebalance instruction including the instruction contents determined in Step 706, to the selected rebalance function.

In the second embodiment, the app-sorted manager 901 coordinates the node 911 of monitoring the physical capacity of the storing device 101 with the rebalance function of rebalancing the data (controlling the logical capacity) according to the defined distribution (storage ratio). The app-sorted manager 901 obtains the information indicating the physical capacities from all the nodes 911 and controls the rebalance (data amount distribution) performed by the rebalance function, to equalize the physical capacities of all the nodes 911. According to this, even when any rebalance function rebalances the data according to the distribution (storage ratio) defined in this rebalance function, it is expected that the equalization of the physical capacities is kept (in other words, the shortage of the physical residual capacity is avoided).

Third Embodiment

A third embodiment will be described. At that time, a different point from at least one of the first and the second embodiments is mainly described and the common point with at least one of the first and the second embodiments is not described and simply described.

The third embodiment is different from the first and the second embodiments in that the manager is not included, the app does not include the app-sorted manager, and that the storage service includes a storage service-sorted manager described later.

Figure 12:
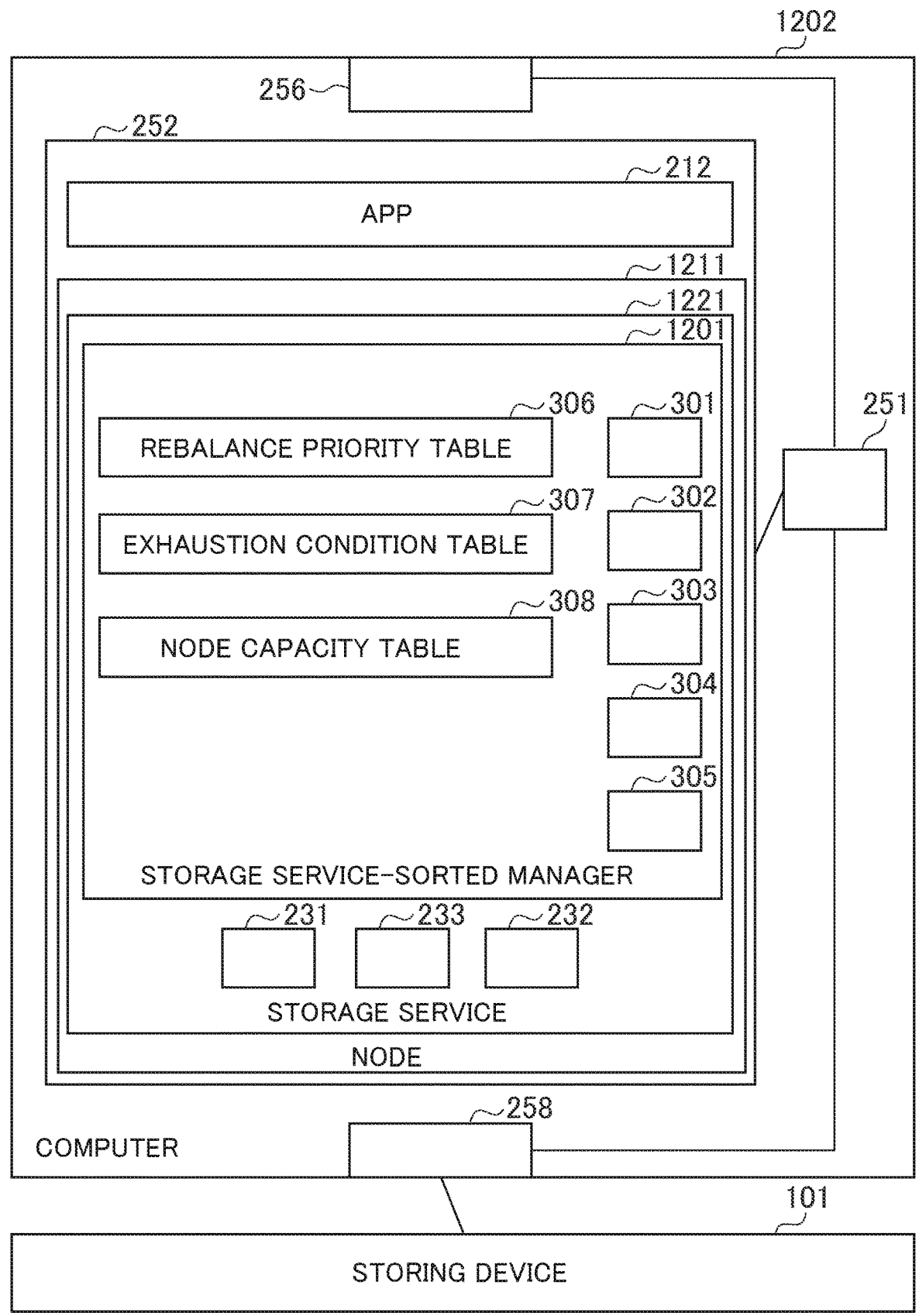
FIG. 12 is a block diagram showing the structure of a computer according to a third embodiment.

FIG. 12 shows the structure of a computer 1202 according to the third embodiment.

The memory 252 of the computer 1202 stores the app 212 and a node 1211.

The node 1211 has a storage service 1221.

The storage service 1221 includes the capacity monitoring function 231, the capacity notice function 232, the rebalance function 233, and a storage service-sorted manager 1201.

The storage service-sorted manager 1201 includes the table setting function 301, the capacity receiving function 302, the exhaustion detecting function 303, the rebalance selecting function 304, and the rebalance instructing function 305. The storage service-sorted manager 1201 controls the rebalance priority table 306, the exhaustion condition table 307, and the node capacity table 308.

The computer system includes a plurality of nodes 1211 and therefore, the computer system includes a plurality of storage services 1221. Only the representative storage service 1221 may have the storage service-sorted manager 1201 or the respective storage services 1221 may have the above and operate together in cooperation. In this embodiment, assume that the representative storage service 1221 has the storage service-sorted manager 1201.

The table setting processing, the capacity information updating processing, and the rebalance control processing according to the third embodiment are the same as those of the first embodiment. The above processing, however, is performed not by the manager 103 but by the storage service-sorted manager 1201.

The storage service 1221 regularly performs the capacity monitoring processing. The capacity monitoring processing according to the third embodiment includes Step 601 and Step 602 shown in FIG. 6. In the capacity monitoring processing according to the third embodiment, the storage service 1221 notifies the storage service-sorted manager 1201 of the capacity information obtained in Step 602.

In the third embodiment, the storage service-sorted manager 1201 coordinates the node 1211 of monitoring the physical capacity of the storing device 101 with the rebalance function of rebalancing the data (controlling the logical capacity) according to the defined distribution (storage ratio). The storage service-sorted manager 1201 obtains the information indicating the physical capacities from all the nodes 1211, and controls the rebalance performed by the rebalance function (distribution of the data amount) to equalize the physical capacities of all the nodes 1211. According to this, even when any rebalance function rebalances the data according to the distribution (storage ratio) defined in the rebalance function, it is expected that the equalization of the physical capacities is kept (in other words, the shortage of the physical residual capacity is avoided).

Fourth Embodiment

A fourth embodiment will be described. At that time, a different point from at least one of the first to the third embodiments is mainly described and the common point with at least one of the first to third embodiments is not described or simply described.

The fourth embodiment is different from the first to third embodiments in that the manager is not included, the app does not include the app-sorted manager, the storage service does not include the storage service-sorted manager, and that the computer includes a computer-sorted manager.

Figure 13:
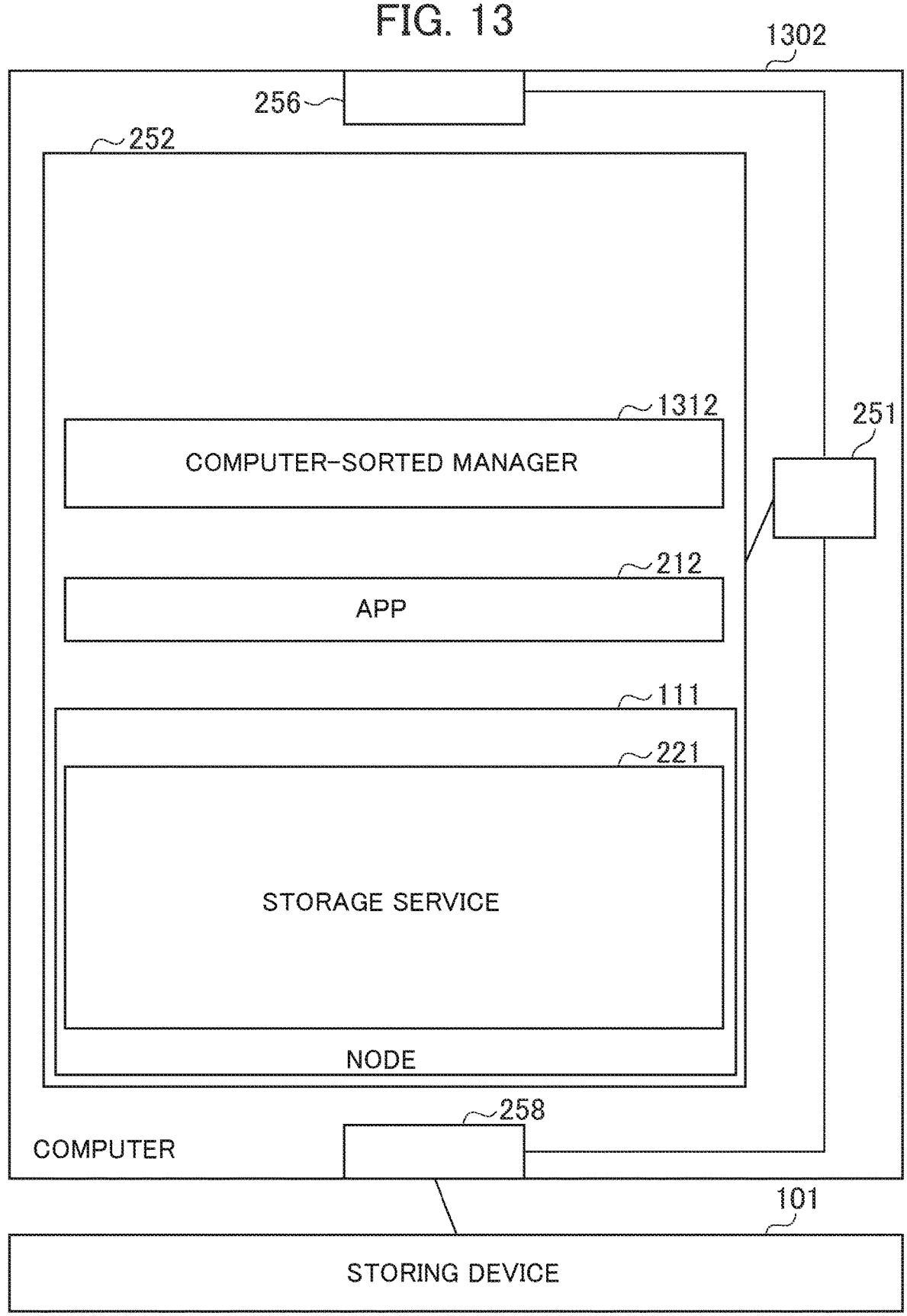
FIG. 13 is a block diagram showing the structure of a computer according to a fourth embodiment.

FIG. 13 shows the structure of a computer 1302 according to the fourth embodiment.

The memory 252 of the computer 1302 stores a computer-sorted manager 1301 in addition to the app 212 and the node 111. Only the representative computer 1302 may have the computer-sorted manager 1301 or the respective computers 1302 may have the above and operate together in cooperation. In this embodiment, assume that the representative computer 1302 has the computer-sorted manager 1301.

The table setting processing, the capacity information updating processing, and the rebalance control processing according to the fourth embodiment are the same as those of the first embodiment. The above processing, however, is performed not by the manager 103 but by the computer-sorted manager 1301.

The storage service 221 regularly performs the capacity monitoring processing. The capacity monitoring processing according to the fourth embodiment includes Step 601 and Step 602 shown in FIG. 6. In the capacity monitoring processing according to the fourth embodiment, the storage service 221 notifies the computer-sorted manager 1301 of the capacity information obtained in Step 602.

In the fourth embodiment, the computer-sorted manager 1301 coordinates the node 111 of monitoring the physical capacity of the storing device 101 with the rebalance function of rebalancing the data (controlling the logical capacity) according to the defined distribution (storage ratio). The computer-sorted manager 1301 obtains the information indicating the physical capacities from all the node 111 and controls the rebalance performed by the rebalance function (distribution of the data amount) to equalize the physical capacities of all the nodes 1211. According to this, even when any rebalance function rebalances the data according to the distribution (storage ratio) defined in the rebalance function, it is expected that the equalization of the physical capacities is kept (in other words, the shortage of the physical residual capacity is avoided).

Fifth Embodiment

A fifth embodiment will be described. At that time, a different point from at least one of the first to fourth embodiments is mainly described and the common point with at least one of the first to fourth embodiments is not described or simply described.

Figure 14:
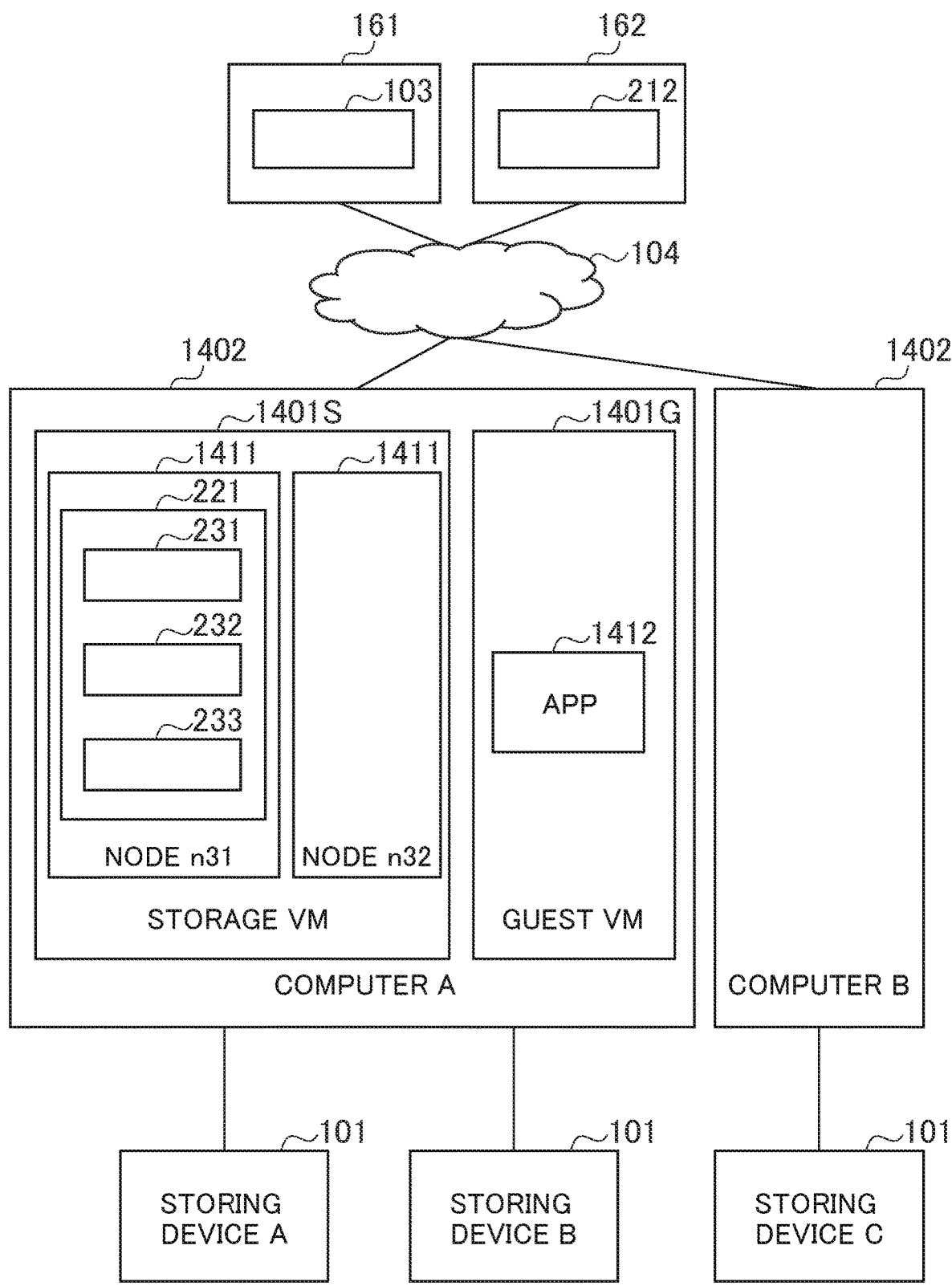
FIG. 14 is a block diagram showing the whole structure of an information system according to a fifth embodiment.

FIG. 14 shows the whole structure of an information system according to the fifth embodiment.

At least one computer 1402 (for example, computer A) performs a plurality of Virtual Machines (VM) 1401. Each of the plural VMs includes a storage VM 1401S and a guest VM 1401G. The storage VM 1401S is a virtual storage device and the guest VM 1401G is a virtual host computer.

The guest VM 1401G performs the app 1412 of issuing I/O request to the storage VM 1401S.

The storage VM 1401 performs a plurality of nodes 1411 (for example, the nodes n31 and n32) respectively corresponding to the plural storing devices 101 (for example, the storing devices A and B). For example, the representative node 1411 (for example, the node n31) has the storage service 221.

According to the fifth embodiment, the same effects as those of the first embodiment can also be expected.

As mentioned above, although some embodiments have been described, these are only examples for describing the invention and the scope of the invention is not intended to be restricted to these embodiments. The invention can be carried out in various forms.

For example, the node 111 and the storing device 101 may be 1:N (N is the integer of 1 and more).

Further, one example of the entity having the rebalance function may be a storage service, instead of or in addition to the app. The rebalance function of the storage service may be a function of rebalancing data so that the distribution of the plural logical capacities recognized by the storage service corresponding to the plural storing devices may be a predetermined distribution.

LIST OF REFERENCE SIGNS

102 . . . computer

The invention claimed is:

1. A data rebalance control system comprising:
a plurality of storage devices including one and more memories; and
at least one processor coupled to the plurality of storage devices,
wherein the at least one processor:
(A) stores, in the plurality of storage devices, capacity information including information indicating a plurality of physical capacities corresponding to the plurality of storage devices which include at least one storage device having a compression function, coupled to one and more computers included in a computer system,
(B) determines instruction contents for an entity having a rebalance function, based on the capacity information,
the rebalance function of the entity being a function of rebalancing data so that distribution of a plurality of logical capacities recognized by the entity; corresponding to the plurality of storage devices, becomes a predetermined distribution,
the instruction contents including a definition about logical capacity distribution; and
(C) transmits, to the entity, a rebalance instruction that is an instruction to rebalance data according to the determined instruction contents,
wherein the rebalance control function:
determines whether or not at least one of the plurality of storage devices satisfies a condition, including at least a physical residual capacity of the at least one of the plurality of storage devices, for requiring rebalance; and
performs (B) and (C) when a result of the determination is true and does not perform (B) and (C) when the result of the determination is false, and
wherein the condition is different in each of two and more storage devices, of the plurality of storage devices, and
wherein the entity for (B) is at least one entity of one and more entities storing data in the storage device associated with the condition having the result of the determination being true.

2. The data rebalance control system according to claim 1, wherein at least one of the one and more computers included in the computer system performs a storage control function including a function of monitoring a plurality of physical capacities corresponding to the plurality of storage devices and a function of notifying the capacity information including the information indicating the plural physical capacities, and
wherein the processor unit performs a rebalance control function, which includes:
receiving the capacity information notified by the storage control function;
storing the received capacity information in (A); and
performing (B) and (C) when the condition is met.

3. The data rebalance control system according to claim 1, wherein when at least the one entity has a plurality of rebalance functions, the instruction contents determined in (B) are the instruction contents for a rebalance function having the highest priority of the plural rebalance functions.

4. The data rebalance control system according to claim 2, comprising a control system which controls the computer system,
wherein the control system includes the storage device and the at least one processor which performs the rebalance control function.

5. The data rebalance control system according to claim 2, comprising at least one computer of the one and more computers included in the computer system,
wherein the above one computer includes the storage device and the at least one processor which performs the rebalance control function and the storage control function.

6. The data rebalance control system according to claim 5, wherein the at least one processor further performs the entity, and
wherein the entity is an application program, including the rebalance control function.

7. The data rebalance control system according to claim 6, wherein the rebalance control function determines whether rebalance is necessary or not for the application program including the rebalance control function.

8. The data rebalance control system according to claim 5, wherein the storage control function includes the rebalance control function.

9. The data rebalance control system according to claim 1, wherein in each of the plurality of storage devices;
the physical capacity is one of a physically used capacity, which is a total amount of data actually stored in the storage device, the physical residual capacity, which is a difference between the physical storage capacity of the storage device and a physically used capacity of the storage device, a physically used ratio, which is a ratio of the physically used capacity in the physical storage capacity, and a physical residual ratio, which is a ratio of the physical residual capacity in the physical storage capacity; and the logical capacity is one of a logically used capacity, which is a total amount of data stored in a logical storage space based on the storage device, a logical residual capacity, which is a difference between the logical storage capacity of the storage device and the logically used capacity of the storage device, a logically used ratio, which is a ratio of the logically used capacity in the logical storage capacity, and a logical residual ratio, which is a ratio of the logical residual capacity in the logical storage capacity.

10. The data rebalance control system according to claim 1,
wherein each of the plural physical capacities is the physical residual capacity.

11. The data rebalance control system according to claim 1,
wherein each of the plurality of storage devices has a compression function.

12. The data rebalance control system according to claim 1,
wherein the definition included in the instruction contents is a definition about a logical capacity distribution needed to avoid the physical residual capacity of at least the one storage device of the plurality of storage devices from being exhausted.

13. A data rebalance controlling method comprising:
(A) determining instruction contents for an entity having a rebalance function, based on capacity information including information indicating a plurality of physical capacities corresponding to a plurality of storage devices which include at least one storage device having a compression function, coupled to one and more computers included in a computer system,
the rebalance function of the entity being a function of rebalancing data so that distribution of a plurality of logical capacities recognized by the entity, corresponding to the plurality of storage devices, becomes a predetermined distribution,
the instruction contents including a definition about logical capacity distribution;
(B) transmitting, to the entity, a rebalance instruction that is an instruction to rebalance data according to the determined instruction contents;
(C) determining whether or not at least one of the plurality of storage devices satisfies a condition, including at least a physical residual capacity of the at least one of the plurality of storage devices, for requiring rebalance; and
(D) performing (A) and (B) when a result of the determination is true and not performing (A) and (B) when the result of the determination is false,
wherein the condition is different in each of two and more storage devices, of the plurality of storage devices, and
wherein the entity for (B) is at least one entity of one and more entities storing data in the storage device associated with the condition having the result of the determination being true.

\* \* \* \* \*